United States Patent
Yoshida et al.

(10) Patent No.: US 9,830,195 B2
(45) Date of Patent: Nov. 28, 2017

(54) APPARATUS AND METHOD FOR CONTROLLING EXECUTION OF PROCESSES IN A PARALLEL COMPUTING SYSTEM

(71) Applicant: FUJITSU LIMITED, Kawasaki-shi, Kanagawa (JP)

(72) Inventors: Yuki Yoshida, Yamato (JP); Masaru Kase, Kawasaki (JP); Toshiyuki Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 222 days.

(21) Appl. No.: 14/475,961

(22) Filed: Sep. 3, 2014

(65) Prior Publication Data

US 2015/0095622 A1 Apr. 2, 2015

(30) Foreign Application Priority Data

Sep. 30, 2013 (JP) .................................. 2013-205534

(51) Int. Cl.
*G06F 9/52* (2006.01)
*G06F 13/372* (2006.01)
*G06F 13/374* (2006.01)
*G06F 13/362* (2006.01)

(52) U.S. Cl.
CPC ............ *G06F 9/52* (2013.01); *G06F 13/3625* (2013.01); *G06F 13/372* (2013.01); *G06F 13/374* (2013.01)

(58) Field of Classification Search
CPC ... G06F 13/372; G06F 13/3625; G06F 13/374
USPC ........................................................ 710/118
See application file for complete search history.

(56) References Cited

U.S. PATENT DOCUMENTS

| | | | |
|---|---|---|---|
| 5,283,902 A | | 2/1994 | Dorn |
| 5,499,345 A | * | 3/1996 | Watanabe ........... G06F 13/3625 710/117 |
| 5,506,968 A | * | 4/1996 | Dukes ................... G06F 13/364 710/240 |

(Continued)

FOREIGN PATENT DOCUMENTS

| | | |
|---|---|---|
| JP | 04-283805 | 10/1992 |
| JP | 2000-253060 | 9/2000 |

(Continued)

OTHER PUBLICATIONS

Hennessy et al., "Computer Architecture—A Quantitative Approach," 3rd Ed., 2002, Morgan Kaufmann Publishers, pp. 101-105, 500-509.*

(Continued)

*Primary Examiner* — Yuqing Xiao
(74) *Attorney, Agent, or Firm* — Staas & Halsey LLP

(57) ABSTRACT

An apparatus includes an arbiter and a plurality of arithmetic processors, each including an arithmetic circuit and a measuring circuit. The arithmetic circuit executes an arithmetic process, and the measuring circuit measures a progress level indicating a progress of the arithmetic process executed by the arithmetic circuit. Upon receiving access requests to an external device from first arithmetic processors included in the plurality of arithmetic processors, the arbiter arbitrates the access requests, based on a result of comparing the progress levels measured by the measuring circuits of the first arithmetic processors.

11 Claims, 9 Drawing Sheets

(56) References Cited

U.S. PATENT DOCUMENTS

| | | | | |
|---|---|---|---|---|
| 5,778,200 | A * | 7/1998 | Gulick | G06F 13/364 710/113 |
| 6,006,319 | A * | 12/1999 | Takahashi | G06F 9/3802 345/503 |
| 6,178,475 | B1 * | 1/2001 | O'Brien | G06F 13/3625 710/113 |
| 6,226,702 | B1 * | 5/2001 | Yakashiro | G06F 13/364 710/105 |
| 6,629,177 | B1 * | 9/2003 | Chong | G06F 13/36 710/240 |
| 7,181,558 | B2 * | 2/2007 | Endo | G06F 13/364 370/438 |
| 7,474,670 | B2 * | 1/2009 | Nowshadi | G06F 9/5011 370/232 |
| 7,769,936 | B2 * | 8/2010 | Mace | G06F 13/364 710/113 |
| 7,962,678 | B2 * | 6/2011 | Minami | G06F 13/362 710/110 |
| 8,065,459 | B2 * | 11/2011 | Bekooij | G06F 9/48 710/200 |
| 9,367,498 | B2 * | 6/2016 | Amano | G06F 13/362 |
| 9,405,711 | B2 * | 8/2016 | Fleischer | G06F 13/1663 |
| 2003/0191880 | A1 * | 10/2003 | Lin | G06F 13/3625 710/116 |
| 2006/0064695 | A1 * | 3/2006 | Burns | G06F 9/3851 718/100 |
| 2007/0047458 | A1 * | 3/2007 | Adkisson | G06F 1/14 370/252 |
| 2007/0234014 | A1 * | 10/2007 | Kobayashi | G06F 9/3824 712/220 |
| 2009/0100432 | A1 * | 4/2009 | Holloway | G06F 9/4881 718/103 |
| 2012/0059962 | A1 * | 3/2012 | Lai | G06F 13/364 710/113 |
| 2013/0163608 | A1 | 6/2013 | Nagatsuka | |

FOREIGN PATENT DOCUMENTS

| | | |
|---|---|---|
| JP | 2003-337713 | 11/2003 |
| JP | 2010-113414 | 5/2010 |
| JP | 2013-135387 | 7/2013 |

OTHER PUBLICATIONS

Notification of Reasons for Refusal of Japanese Patent Application No. 2013-205534 dated Mar. 21, 2017.

* cited by examiner

FIG. 8

| ID | PACKET TYPE | DESTINATION ADDRESS | REQUEST ORIGIN ADDRESS | PROGRESS LEVEL | DATA |

APPARATUS AND METHOD FOR CONTROLLING EXECUTION OF PROCESSES IN A PARALLEL COMPUTING SYSTEM

CROSS-REFERENCE TO RELATED APPLICATION

This application is based upon and claims the benefit of priority of the prior Japanese Patent Application No. 2013-205534, filed on Sep. 30, 2013, the entire contents of which are incorporated herein by reference.

FIELD

The embodiments discussed herein are related to apparatus and method for controlling execution of processes in a parallel computing system.

BACKGROUND

A parallel computer system including a plurality of processors is conventionally known in which the plurality of processors execute processing in parallel. For example, a parallel computer system that is connected over a network to a plurality of computers, a multiprocessor system in which a plurality of processors are connected at a bus level, and a chip multi-processor (CMP) in which a plurality of processors are integrated on the same chip are known.

These types of parallel computer systems divide one task into pieces of processing such as a plurality of processes or threads, and then allocate the divided processes or threads to the processors. In this case, the processors execute external accesses to memories, networks, and/or storages and communicate with other processors to obtain data for executing the allocated processing. The processors then use the obtained data to execute the processing, execute external accesses, and output the execution results of the processing.

Moreover, the parallel computer system waits until all the processors complete the processing. The parallel computer system then divides new tasks and allocates the divided pieces of processing to the processors when all the processors have completed the processing.

Japanese Laid-open Patent Publication No. 2000-253060 is a reference document.

SUMMARY

According to an aspect of the invention, an apparatus includes an arbiter and a plurality of arithmetic processors. Each of the plurality of processors includes an arithmetic circuit configured to execute an arithmetic process, and a measuring circuit configured to measure a progress level indicating a progress of the arithmetic process executed by the arithmetic circuit. The arbiter is configured to, upon receiving access requests to an external device from first arithmetic processors of the plurality of arithmetic processors, arbitrate the access requests, based on a comparison result of comparing the progress levels measured by the measuring circuits of the first arithmetic processors that are transmission sources of the access requests.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a packet format outputted by an information processing device, according to an embodiment.

DESCRIPTION OF EMBODIMENTS

In the techniques of the abovementioned parallel computer systems, there is a problem that the overall processing performance is reduced since a processor that has completed the processing earlier than other processors waits wastefully until the other processors complete their processing.

For example, the parallel computer system executes the processing most efficiently when one job is divided into a plurality of processes so that the processing times of the processors are the same. However, when external accessing or communication between processors is executed, delays and conflicts occur depending upon the conditions of the communication destination devices and thus the time desired for performing the external accesses and/or the communication between processors changes for each processor. Consequently, the processors are unable to finish the processing at the same time as a result of the difficulty in dividing jobs so that the processing time among the processors is the same.

Embodiments of an information processing device and a method for controlling an information processing device based on the drawings are described in detail hereinbelow with reference to the drawings. The following embodiments are not limited to the features disclosed herein. The embodiments may be combined as appropriate within a consistent scope.

First Embodiment

Figure 1:
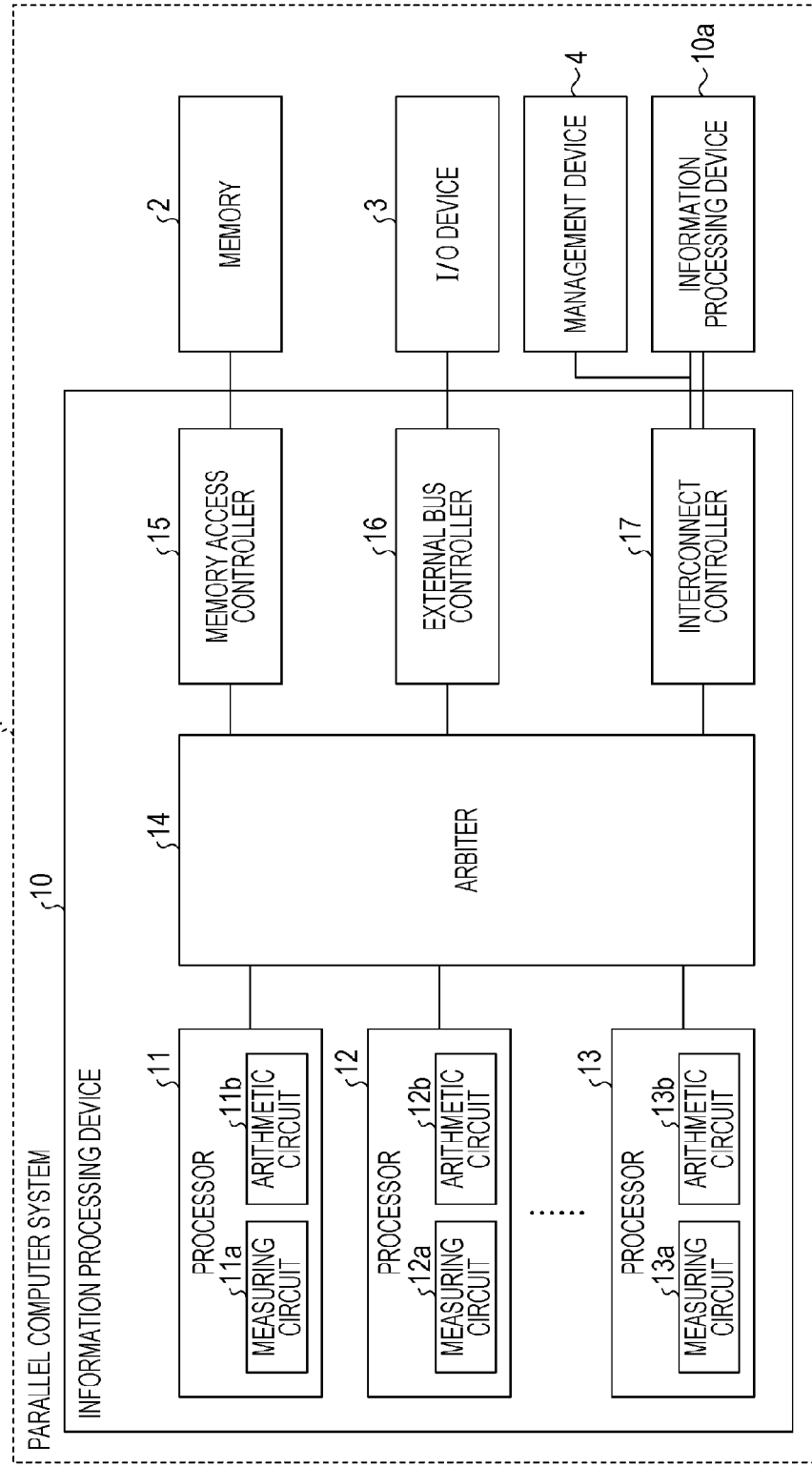
FIG. 1 is a diagram illustrating an example of a hardware configuration of an information processing device, according to an embodiment.

An example of a parallel computer system 1 provided with a plurality of information processing devices each including a plurality of processors will be described hereinbelow with reference to FIG. 1, according to a first embodiment. FIG. 1 is a diagram illustrating an example of a hardware configuration of an information processing device, according to an embodiment. As illustrated in FIG. 1, the parallel computer system 1 includes a memory 2, an input/output (I/O) device 3, a management device 4, and information processing devices 10 and 10a as external devices.

While omitted in FIG. 1, the parallel computer system 1 is assumed to include other information processing devices that perform the same functions as the information processing device 10. Moreover, devices that are the same as the memory 2 and the I/O device 3 are connected to the information processing device 10a, and perform the same functions as the information processing device 10. Therefore, the description thereof will be omitted from the following explanation.

The information processing device 10 includes a plurality of processors 11 to 13, an arbiter 14, a memory access controller 15, an external bus controller 16, and an interconnect controller 17. The processor 11 includes a measuring circuit 11a and an arithmetic circuit 11b. The processor 12 includes a measuring circuit 12a and an arithmetic circuit 12b. The processor 13 includes a measuring circuit 13a and an arithmetic circuit 13b.

That is, the processors 11 to 13 are arithmetic processors having the same hardware configuration. The processors 12 and 13 perform the same functions as the processor 11 and explanations thereof will be omitted hereinbelow. The information processing device 10 may include processors, other than the processors 11 to 13 illustrated in FIG. 1, that exhibit the same functions as the processor 11.

FIG. 1 depicts, out of the hardware configuration of the information processing device 10, only the circuitry related to outputs from the processors 11 to 13 for transmitting signals to the external devices. However, the information processing device 10 also includes circuitry related to inputs for transmitting signals from the external devices to the processors 11 to 13 in addition to the hardware configuration illustrated in FIG. 1.

Next, an explanation of the functions exhibited by the hardware will be provided. The memory 2 is a storage device that is connected to the information processing device 10 via a memory bus and that is managed and controlled by the information processing device 10. For example, various types of data for the information processing device 10 or the information processing device 10a to execute arithmetic processes are stored in the memory 2.

The I/O device 3 is an external device that is connected to the information processing device 10 via various buses and that is managed and controlled by the information processing device 10. For example, the I/O device 3 is a device for various types of inputs, and a storage device, such as a hard disk drive (HDD), a solid state drive (SSD), or a flexible disk (FD).

The management device 4 is an information processing device for managing the information processing devices 10 and 10a in the parallel computer system 1. Specifically, the management device 4 divides a task into a plurality of processes or threads when a task is to be executed in parallel by the processors 11 to 13 in the parallel computer system 1. The management device 4 transmits, through an interconnect, the divided processes and threads to the processors 11 to 13 and causes the processors 11 to 13 to execute the processes and threads. In the following explanation, processes and threads which the management device 4 causes the processors 11 to 13 to execute will be described as division processes.

The information processing device 10 is an information processing device that executes the division process by using the processors 11 to 13. The processor 11 is an arithmetic processing device for executing various types of arithmetic processes and is, for example, a central processing unit (CPU), a microprocessing unit (MPU), or an application specific integrated circuit (ASIC). Upon receiving the division process from the management device 4, the processor 11 further divides the received division process into a plurality of unit processes. Here, a unit process is a process that are executed in a unit time by the processor 11, for example, a process that is executed by the processor 11 in a time gained by a local time that is measured independently by the processor 11. The processor 11 then executes the divided plurality of unit processes.

The processor 11 measures a progress level that indicates the progress of the division process being executed by the processor 11. For example, the processor 11 includes a counter for measuring the progress level and increments a value of the counter by one each time a unit process is executed. When a memory access to the memory 2 is to be executed or when an access to the I/O device 3 is to be executed, the processor 11 generates an access request, and outputs the generated access request and the measured progress level to the arbiter 14. The processor 11 receives, from the arbiter 14, the data read from the memory 2 and the data obtained from the I/O device 3, and uses the received data to continue the execution of the division process.

The measuring circuit 11a is a measuring circuit for measuring a progress level that indicates the progress of the division process executed by the processor 11. For example, the measuring circuit 11a is a counter that increments a value by one each time the arithmetic circuit 11b executes a unit process. Specifically, the measuring circuit 11a increments a value of the progress level by one upon receiving, from the arithmetic circuit 11b, a signal indicating the fact that the execution of a unit process is completed. The measuring circuit 11a then outputs the value of the measured progress level to the arbiter 14.

The arithmetic circuit 11b is a circuit for executing various types of arithmetic processes, and is, for example, a core of the processor 11. Upon receiving the division process allocated to the processor 11, the arithmetic circuit 11b divides the received division process into a plurality of unit processes and executes the divided plurality of unit processes. When a unit process is completed, the arithmetic circuit 11b outputs a signal indicating the fact that the unit process is completed to the measuring circuit 11a, and then executes a next unit process.

Here, the unit process executed by the arithmetic circuit 11b may include the execution of an external access such as a memory access to the memory 2, an access to the I/O device 3, or communication with another processor in the information processing device 10a. For example, when a unit process to read data from the memory 2 is executed, the arithmetic circuit 11b outputs the access request to the memory 2, to the arbiter 14.

Upon receiving a notification that an access right has been obtained from the arbiter 14, the arithmetic circuit 11b generates a read request for requesting a read process for the memory 2, and then outputs the generated read request to the memory access controller 15 via the arbiter 14. Upon receiving a reply with respect to the read request, the arithmetic circuit 11b obtains the data included in the received reply, that is, the data read from the memory 2, and proceeds to use the obtained data to execute the arithmetic process included in the unit process.

Upon completion of the unit process, the arithmetic circuit 11b outputs the signal indicating that the execution of the unit process is completed, to the measuring circuit 11a. In this way, the measuring circuit 11a increases the value of the progress level while the arithmetic circuit 11b is executing the various arithmetic processes, and waits without increasing the value of the progress level during at least a period from when the arithmetic circuit 11b starts the external access until the external access is completed.

The arithmetic circuit 11b may issue, to the memory 2, a write request for requesting a data write process in addition to the read request. The arithmetic circuit 11b may also issue read requests, write requests, and requests for executing various types of processes, with respect to the I/O device 3. The arithmetic circuit 11b may also issue requests to various types of external devices managed by the information processing device 10a. In the following explanation, various types of requests issued by the arithmetic circuit 11b will be also expressed as "process requests".

Figure 2:
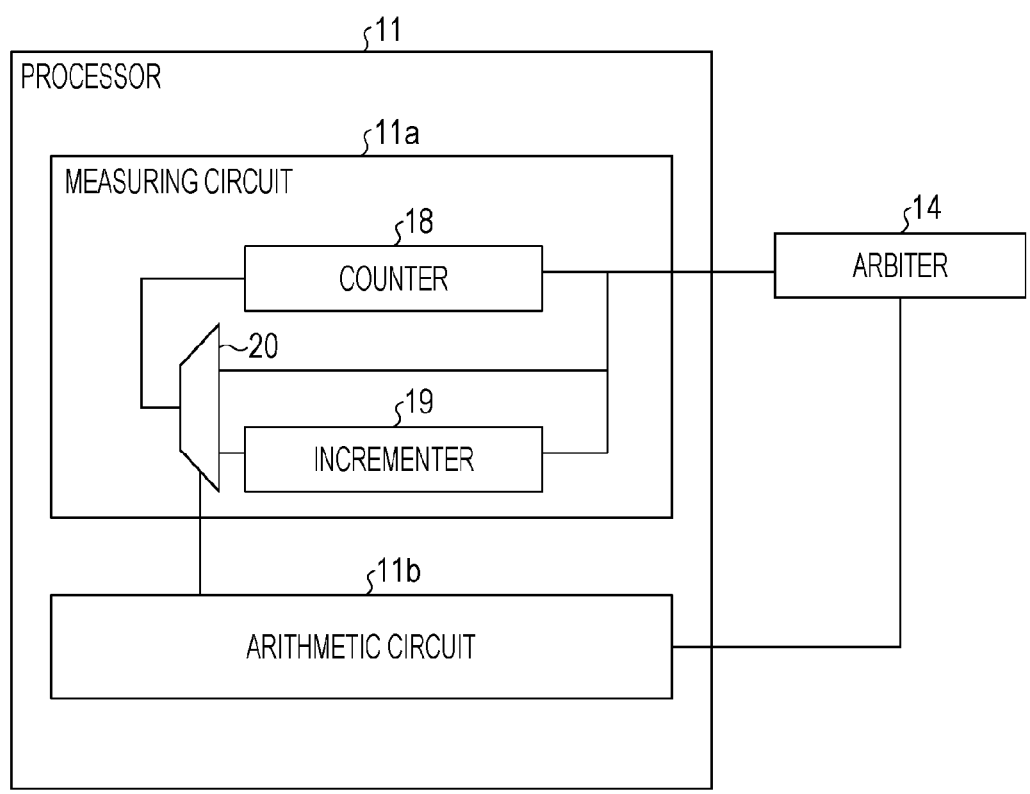
FIG. 2 is a diagram illustrating an example of a hardware configuration of a processor, according to an embodiment.

An example of a hardware configuration in the processor 11 for exhibiting the abovementioned functions will be explained hereinbelow with reference to FIG. 2. FIG. 2 is a diagram illustrating an example of a hardware configuration of a processor, according to an embodiment. As illustrated in FIG. 2, the processor 11 includes a measuring circuit 11a and an arithmetic circuit 11b which are connected to an arbiter 14. The measuring circuit 11a includes a counter 18, an incrementer 19, and a multiplexer 20.

The counter 18 counts a value indicating a progress level and outputs the counted value to the arbiter 14. For example, the counter 18 is a holding circuit, such as a flip-flop for holding a value indicated by a signal outputted by the multiplexer 20. The counter 18 outputs a signal indicating the held value to the arbiter 14, to the incrementer 19, and to the multiplexer 20.

The incrementer 19 outputs a value obtained by adding one to the value held by the counter 18, to the multiplexer 20. For example, upon receiving a signal that indicates the value held by the counter 18, the incrementer 19 generates a signal that indicates a value obtained by adding one to the received signal, and outputs the generated signal to the multiplexer 20.

The multiplexer 20 increments by one a progress level value held by the counter 18 each time a unit process executed by the arithmetic circuit 11b is completed. Specifically, the multiplexer 20 receives, as input signals, the signal outputted by the counter 18 and the signal outputted by the incrementer 19. The multiplexer 20 receives from the arithmetic circuit 11b a signal indicating that a unit process is finished, as a selection signal.

Upon receiving the signal indicating that a unit process is completed from the arithmetic circuit 11b, the multiplexer 20 outputs the signal received from the incrementer 19. For example, the arithmetic circuit 11b outputs a pulse signal whose electric potential is "high", to the multiplexer 20 when a unit process is completed. Meanwhile, upon receiving, from the arithmetic circuit 11b, a signal whose electric potential is "high", the multiplexer 20 outputs the signal outputted by the incrementer 19 to the counter 18. Conversely, upon receiving, from the arithmetic circuit 11b, a signal whose electric potential is "low", the multiplexer 20 inputs the signal outputted by the counter 18 to the counter 18 again. As a result, the multiplexer 20 is able to increment by one the progress level held by the counter 18 when a unit process executed by the arithmetic circuit 11b is completed.

In the abovementioned example, the measuring circuit 11a increases the progress level value each time the arithmetic circuit 11b completes a unit process, but the embodiment is not limited thereto. For example, the measuring circuit 11a may execute a local time count based on a clock operated by the processor 11 from the point in time that the arithmetic circuit 11b started the division process.

The arithmetic circuit 11b sends a request to the measuring circuit 11a to output the progress level when an access request is to be issued to an external device, such as the memory 2, the I/O device 3, or to a memory or I/O device managed by the information processing device 10a. In this case, the measuring circuit 11a outputs the value of the local time as the progress level, and then stops the local time count.

The arithmetic circuit 11b issues access requests to the arbiter 14 when process requests to the external devices are to be issued. For example, the arithmetic circuit 11b sets the electric potential of a signal to be outputted to the arbiter 14 at "high". Upon receiving notification that an access right has been obtained from the arbiter 14, the arithmetic circuit 11b then transmits to the arbiter 14 the process request for the external device.

Upon receiving a reply to the process request via a reception circuit which is not depicted in the drawing, the arithmetic circuit 11b outputs a signal indicating a count start of the local time to the measuring circuit 10a. In this case, the measuring circuit 11a starts the local time count based on the clock operated by the processor 11. In this way, the measuring circuit 11a is able to measure the progress level of the division process executed by the processor 11. In the case of executing the above mentioned process, the measuring circuit 11a starts the local time count based on the clock operated by the processor 11 when the arithmetic circuit 11b starts the division process anew.

The explanation is continued by referring back to FIG. 1. The arbiter 14 is an arbitration circuit for arbitrating access requests to external devices, such as the memory 2, the I/O device 3, and the information processing device 10a. Specifically, upon receiving access requests for external devices form a plurality of processors, the arbiter 14 executes an arbitration process to arbitrate the access requests based on a comparison result of progress levels measured by measuring circuits provided for the processors serving as transmission sources of the access requests.

For example, the arbiter 14 receives an access request for the memory 2 from the arithmetic circuit 11b of the processor 11, and receives an access request for the memory 2 from the arithmetic circuit 12b of the processor 12. In this case, the arbiter 14 receives the progress level of the division process executed by the processor 11 which is measured by the measuring circuit 11a of the processor 11, and receives the progress level of the division process executed by the processor 12 which is measured by the measuring circuit 12a of the processor 12. The arbiter 14 then identifies the progress level with the lowest value among the received progress levels. Next, the arbiter 14 outputs, to the memory access controller 15, the process request of the processor serving as the transmission source for the identified progress level.

In this way, when a conflict in access requests occurs, the arbiter 14 outputs the process request of the processor with the lowest progress level value among the processors that are transmission sources of the access requests. As a result, the arbiter 14 is able to balance the progresses of the division process executed by the processors since the external access of the processor with the lowest progress level is prioritized.

When a plurality of external devices that issue the access requests are present, the arbiter 14 executes the abovementioned arbitration process for each external device that is the transmission destination of an access request. For example, the arbiter 14 includes an arbitration circuit for executing the arbitration process for each external device, and the arbitration circuits prioritize and output the access request of the processor with the lowest progress level among the processors that are transmission sources of access requests.

Figure 3:
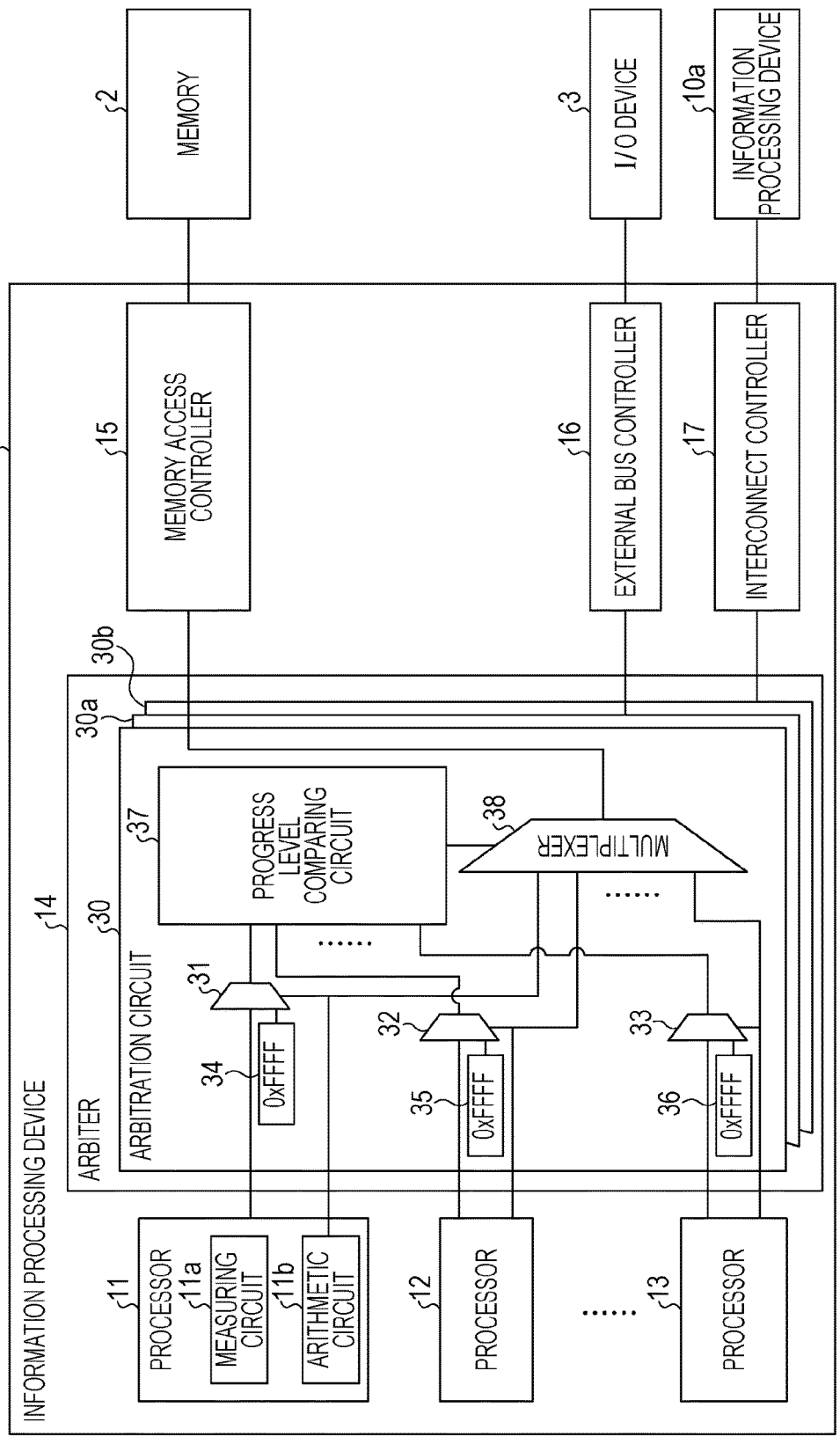
FIG. 3 is a diagram illustrating an example of a hardware configuration of an arbiter, according to an embodiment.

An example of a hardware configuration of the arbiter 14 for exhibiting the abovementioned functions will be explained hereinbelow with reference to FIG. 3. FIG. 3 is a diagram illustrating an example of a hardware configuration of an arbiter, according to an embodiment. In the example illustrated in FIG. 3, for example, the arbiter 14 includes a plurality of arbitration circuits 30, 30a, and 30b.

The arbitration circuit 30 is a circuit for arbitrating access requests for the memory 2, and the arbitration circuit 30a is a circuit for arbitrating access requests for the I/O device 3. The arbitration circuit 30b is a circuit for arbitrating access requests for an external device managed by the information processing device 10a. The arbitration circuit 30a, the arbitration circuit 30b have the same hardware configuration as the arbitration circuit 30 and an explanation thereof is omitted hereinbelow.

The arbitration circuit 30 has a plurality of multiplexers 31 to 33, a plurality of constant holding circuits 34 to 36, a progress level comparing circuit 37, and a multiplexer 38. The constant holding circuits 34 to 36 constantly output a signal indicating a constant hexadecimal number, and output "0xFFFF" that is a signal indicating "0", in the example in FIG. 3. In this case, the constant holding circuits 34 to 36 may be replaced by earths and the like.

Regarding the signal outputted by the arithmetic circuit 11b of the processor 11 as a control signal, the multiplexer 31 outputs one of a signal indicating the progress level outputted by the measuring circuit 11a of the processor 11 and an output of the constant holding circuit 34, to the progress level comparing circuit 37. Regarding the signal outputted by the arithmetic circuit 12b of the processor 12 as a control signal, the multiplexer 32 outputs one of a signal indicating the progress level outputted by the measuring circuit 12a of the processor 12 and an output of the constant holding circuit 35, to the progress level comparing circuit 37. Regarding the signal outputted by the arithmetic circuit 13b of the processor 13 as a control signal, the multiplexer 33 outputs one of a signal indicating the progress level outputted by the measuring circuit 13a of the processor 13 and an output of the constant holding circuit 36, to the progress level comparing circuit 37.

For example, the multiplexer 31 outputs the signal outputted by the constant holding circuit 34 to the progress level comparing circuit 37 while the arithmetic circuit 11b is setting the electric potential of the signal inputted to the multiplexer 38 at "low". The multiplexer 31 outputs the signal indicating the progress outputted by the measuring circuit 11a to the progress level comparing circuit 37 when the arithmetic circuit 11b has set the electric potential of the signal inputted to the multiplexer 38 as an access request for the memory 2 at "high". The multiplexers 32 and 33 perform the same processes as the multiplexer 31 and explanations thereof will be omitted.

The progress level comparing circuit 37 compares the progress levels measured by the processors that are the transmission sources of the access requests for the memory 2. The progress level comparing circuit 37 then outputs, to the multiplexer 38, a control signal that instructs the multiplexer 38 to output the access request of the processor with the lowest value of the progress level among the compared progress levels, to the memory access controller 15.

The following is an explanation of processing executed by the progress level comparing circuit 37. The following explanation describes processing that is executed by the progress level comparing circuit 37 when the processors 11 to 13 issue access requests for the memory 2 at the same time. For example, the progress level comparing circuit 37 receives a signal indicating a progress level "3" measured by the measuring circuit 11a of the processor 11, a signal indicating a progress level "8" measured by the measuring circuit 12a of the processor 12, and a signal indicating a progress level "6" measured by the measuring circuit 13a of the processor 13. In this case, the progress level comparing circuit 37 compares the received progress levels indicated by the signals and identifies the progress level "3" as the one with the lowest value of the progress level.

The progress level comparing circuit 37 identifies the processor 11 that is the transmission source of the signal indicating the identified progress level and outputs, to the processor 11, a notification indicating that an access right has been given to the processor 11. The progress level comparing circuit 37 outputs a signal indicating the processor 11 to the multiplexer 38. As a result, the processor 11 transmits a process request for the memory 2 through the multiplexer 38 to the memory access controller 15 and executes a memory access to the memory 2.

The progress level comparing circuit 37 compares the progress level "8" measured by the measuring circuit 12a of the processor 12 and the progress level "6" measured by the measuring circuit 13a of the processor 13 when the memory access of the processor 11 is completed. As a result, the progress level comparing circuit 37 identifies the progress level "6" as the one with the lowest value and identifies the processor 13 which is the transmission source of the signal indicating the identified progress level. The progress level comparing circuit 37 then outputs to the identified processor 13 a notification indicating that an access right has been given, and outputs a signal indicating the processor 13 to the multiplexer 38. As a result, the processor 13 transmits a process request for the memory 2 through the multiplexer 38 to the memory access controller 15 and executes the memory access to the memory 2.

When the requested memory access is completed by the processor 13, the progress level comparing circuit 37 receives only the signal indicating the progress level "8" measured by the measuring circuit 12a of the processor 12. In this case, the progress level comparing circuit 37 outputs a signal indicating the processor 12 to the multiplexer 38. As a result, the processor 12 transmits a process request for the memory 2 through the multiplexer 38 to the memory access controller 15 and executes the memory access to the memory 2.

The progress level comparing circuit 37 may use a round-robin or a least recently used (LRU) technique to perform the arbitration when, as a result of the comparison of the plurality of progress levels, a plurality of progress levels with the lowest value are present. For example, the progress level comparing circuit 37 receives the signal indicating the progress level "3" measured by the measuring circuit 11a of the processor 11, and a signal indicating a progress level "3" measured by the measuring circuit 12a of the processor 12. In this case, the progress level comparing circuit 37 may use the round-robin or the LRU technique to select one of the processors 11 and 12, and may output the signal indicating the selected processor to the multiplexer 38.

Regarding the signal outputted by the progress level comparing circuit 37 as a control signal, the multiplexer 38 outputs, to the memory access controller 15, one of the process requests outputted by the arithmetic circuits 11b to 13b of the respective processors 11 to 13. For example, the multiplexer 38 outputs, to the memory access controller 15, the process request outputted by the arithmetic circuit 11b of the processor 11 when the signal indicating the processor 11 is received from the progress level comparing circuit 37.

As described above, upon receiving access requests to the memory 2 from a plurality of processors, the arbitration circuit 30 compares the progress levels of the division processes in the plurality of processors that are transmission sources of access requests and identifies the progress level with the lowest value. The arbitration circuit 30 then outputs the process request received from the processor in which the identified progress level is measured, to the memory access controller 15. As a result, the arbitration circuit 30 is able to improve processing performance in the information processing device 10 as a result of balancing the progress levels of the division processes performed by the plurality of processors.

The arbitration circuit 30a receives access requests for the I/O device 3 from the processors 11 to 13 and performs arbitration for the access requests for the I/O device 3 by acting in the same way as the arbitration circuit 30. The arbitration circuit 30b similarly receives access requests for the information processing device 10a from the processors 11 to 13 and performs arbitration for the access requests for the information processing device 10a by acting in the same way as the arbitration circuit 30.

The explanation continues with referring back to FIG. 1. The memory access controller 15 controls memory access to the memory 2. For example, upon receiving a process request for the memory 2 from the arbiter 14, the memory access controller 15 executes the read process or the write process indicated by the received process request. The memory access controller 15 generates a reply that includes the read data or information on a result of writing the data, and transmits the generated reply to the transmission source of the process request through receiving circuits which are not depicted in the drawings.

The external bus controller 16 is a control device for controlling an external bus that connects the I/O device 3 and the information processing device 10. For example, the external bus controller 16 receives a process request for the I/O device 3 from the arbiter 14 and executes various processes indicated by the received process request. The external bus controller 16 then generates a reply corresponding to the received process request and transmits the generated reply to the transmission source of the process request.

The interconnect controller 17 is a control device for controlling an interconnection that connects the information processing device 10 with the management device 4 and the information processing device 10a. For example, when the interconnect controller 17 receives a process request for the information processing device 10a from the arbiter 14, the interconnect controller 17 transmits the process request to the information processing device 10a via the interconnection. Moreover, when the interconnect controller 17 receives a reply to the received process request from the information processing device 10a, the interconnect controller 17 transmits the received reply to the transmission source of the access request via receiving circuits which are not depicted in the drawings.

In this way, the information processing device 10 measures the progress levels of the division processes executed by the processors 11 to 13. Upon receiving access requests to the same external devices from a plurality of processors, the information processing device 10 executes an arbitration of the access requests based on the progress levels of the division processes executed by the plurality of processors that are the transmission sources of the access requests. As a result, since the progresses of the division processes executed by the processors 11 to 13 are balanced, the information processing device 10 is able to reduce a time difference from when the processors 11 to 13 start the division processes until the processors 11 to 13 complete the division processes. Consequently, the information processing device 10 is able to improve processing performance in parallel processing.

Figure 4:
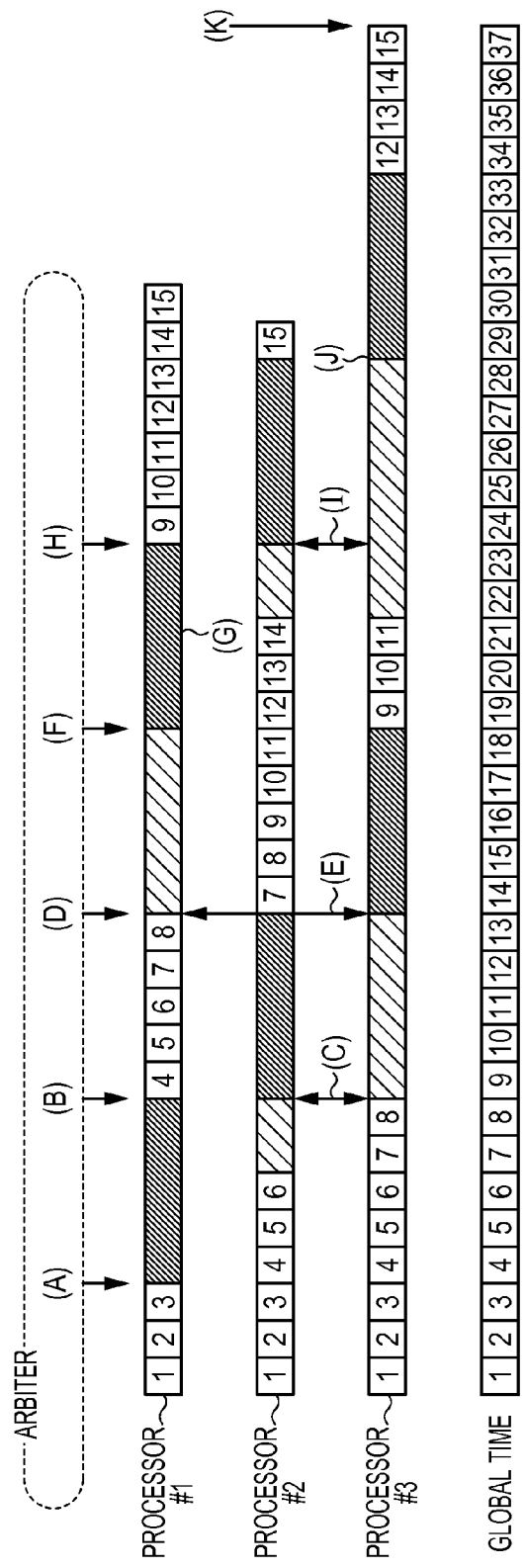
FIG. 4 is a diagram illustrating an example of a flow of processing executed by a conventional parallel computer system.

An example of the effect of the information processing device 10 will be explained with reference to FIGS. 4 and 5. First, an example of processing executed by a conventional parallel computer system will be explained with reference to FIG. 4. FIG. 4 is a diagram illustrating an example of a flow of processing executed by a conventional parallel computer system. FIG. 4 depicts values in local time in which each execution of arithmetic processes by processors #1 to #3 in a conventional parallel computer system are counted, and values in a global time in which executions of arithmetic processes are evenly counted regardless of the conditions of the processors.

Periods during which the processors #1 to #3 are accessing external devices are illustrated with dark hatching in FIG. 4, and waiting time periods from the transmission of access requests to the external devices until the accesses are actually executed are illustrated with light hatching in FIG. 4. In the example in FIG. 4, it is assumed that the arbiter arbitrates the access requests of the processors #1 to #3 by using the round-robin method.

In the example illustrated in FIG. 4, the processor #1 issues access requests when the local time is "3" and "8", and the processor #2 issues access requests when the local time is "6" and "14". In the example illustrated in FIG. 4, the processor #3 issues access requests when the local time is "8" and "11". It is also assumed that the processors #1 to #3 each complete the allocated division process when the local time reaches "15".

For example as depicted at point (A) in FIG. 4, the processor #1 issues an access request at the global time "4". In this case, the arbiter changes the priority from the processor #1 to the processor #2 since the access request of the processor #1 is outputted. Next, the processor #2 issues an access request at the global time "7", and the processor #3 issues an access request at the global time "9".

As depicted at point (B) in FIG. 4, while the access of the processor #1 is finished at the global time "9", the arbiter executes an arbitration process since access requests of the processor #2 and the processor #3 are present as depicted at point (C) in FIG. 4. As a result, the arbiter issues the process request from the processor #2 that has the priority, and then changes the priority from the processor #2 to the processor #3.

Next, as depicted at point (D) in FIG. 4, while the access of the processor #2 is finished at the global time "14", the arbiter executes the arbitration process as depicted at point (E) in FIG. 4 since the processor #1 issues the access request. As a result, the arbiter issues the process request from the processor #3 that has the priority, and then changes the priority from the processor #3 to the processor #1.

Next, as depicted at point (F) in FIG. 4, the access by the processor #3 is finished at the global time "19". As a result, the arbiter issues the process request from the processor #1, and then changes the priority from the processor #1 to the processor #2 as depicted at point (G) in FIG. 4.

When the global time is "22", the processor #2 and the processor #3 both issue access requests at the same time. As depicted at point (H) in FIG. 4, at the global time "24", the arbiter executes the arbitration process since the access of the processor #1 is finished. As a result, the arbiter issues the process request from the processor #2 that has priority as depicted at point (I) in FIG. 4.

As depicted at point (3) in FIG. 4, at the global time "29", the arbiter issues the process request from the processor #3 since the access of the processor #2 is finished. As a result, at the global time "34", the access processing of the processor #3 is finished, and at the global time "37" as depicted at point (K) in FIG. 4, all the processors #1 to #3 complete the division processes thereof.

Figure 5:
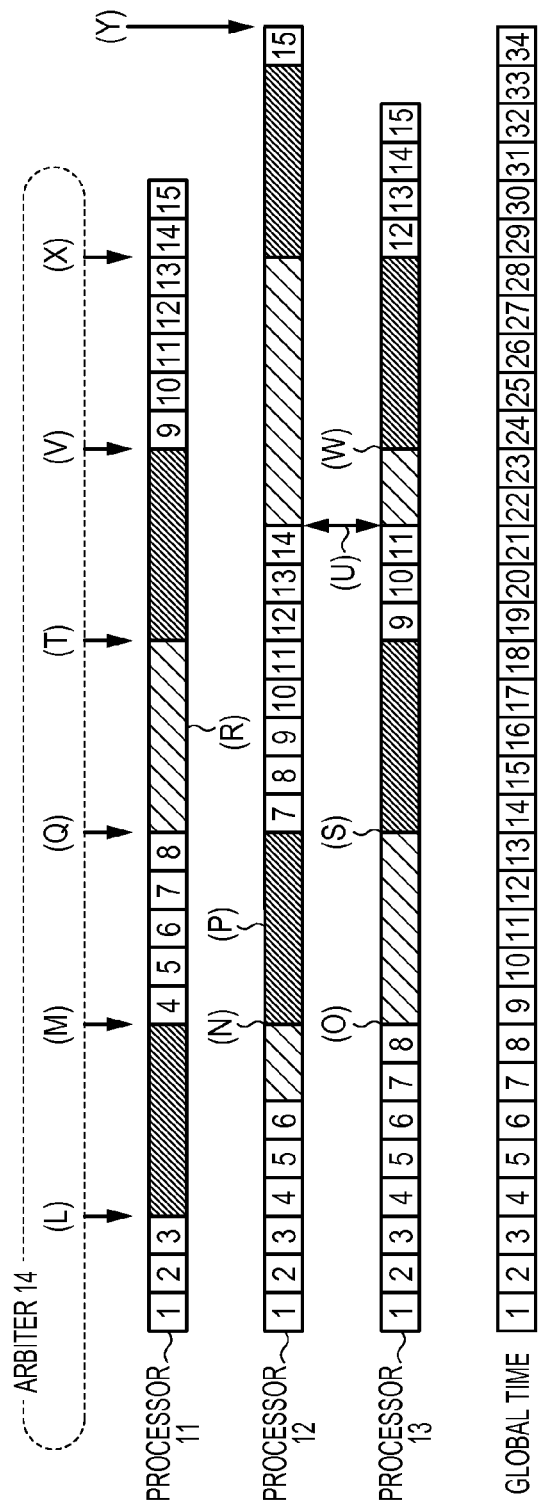
FIG. 5 is a diagram illustrating an example of a flow of processing executed by an information processing device, according to an embodiment.

Next, an explanation of processing executed by the information processing device 10 according to the first embodiment will be provided with reference to FIG. 5. FIG. 5 is a diagram illustrating an example of an operational flowchart for processing executed by an information processing device, according to an embodiment. In the example illustrated in FIG. 5, the arbiter 14 uses the local time in the processors 11 to 13 as the progress level. Moreover, the division processes are allocated among the processors 11 to 13 in the same way as the processors #1 to #3 illustrated in FIG. 4.

For example, the arbiter 14 issues a process request of the processor 11 when the global time is "4" as depicted at point (L) in FIG. 5. As depicted at point (M) in FIG. 5, while the access of the processor 11 is finished at the global time "9", access requests of the processor 12 and the processor 13 are present as depicted at points (N) and (O) in FIG. 5. As a result, the arbiter 14 compares the local time "6" of the processor 12 and the local time "8" of the processor 13 and determines that the local time of the processor 12 has a lower value, that is, the processing of the processor 12 is delayed. As a result, the arbiter 14 issues a process request of the processor 12 as depicted at point (P) in FIG. 5.

Next, as depicted at point (Q) in FIG. 5, when the global time is "14", the access of the processor 12 is finished and, as depicted at points (R) and (S) in FIG. 5, access requests of the processor 11 and the processor 13 are present. As a result, the arbiter 14 compares the local time "8" of the processor 11 and the local time "8" of the processor 13. While the arbiter 14 may select either of the access requests at this time since the local times of the processors have the same value, in the example illustrated in FIG. 5, the process request of the processor 13 is issued by round-robin. As depicted at point (T) in FIG. 5, when the global time is "19", the arbiter 14 issues the process request of the processor 11 since the access of the processor 13 is finished.

As depicted at point (U) in FIG. 5, when the global time is "22", the processor 12 and the processor 13 issues access requests at the same time. The arbiter 14 then arbitrates the access requests issued by the processor 12 and the processor 13 as depicted at point (V) in FIG. 5 at the global time "24" since the access of the processor 11 is finished. Specifically, the arbiter 14 compares the local time "14" of the processor 12 and the local time "11" of the processor 13.

As a result, the arbiter 14 issues the process request of the processor 13 as depicted at point (W) in FIG. 5 since the processing by the processor 11 is finished. As depicted at point (X) in FIG. 5, at the global time "29", the arbiter 14 issues the process request of the processor 12 since the access of the processor 13 is finished. As a result, the information processing device 10 finishes the processing at the global time "34" as depicted at point (Y) in FIG. 5.

In this way, the information processing device 10 prioritizes and issues the access request from the processor having the lowest division process progress level when arbitrating access requests. As a result, the information processing device 10 is able to shorten the time taken for executing tasks.

Moreover, in the example illustrated in FIG. 4, the waiting time of the processor #2, which has completed the division process the earliest, until the processor #3 finishes the division process is "8" units of global time. However, in the example illustrated in FIG. 5, the waiting time of the processor 11, which has completed the division process the earliest, until the processor 12 finishes the division process is "4" units of global time. As a result, the information processing device 10 is able to improve upon the efficiency performance of the division process as a result of balancing the time periods in which the processors 11 to 13 execute the division process.

Figure 6:
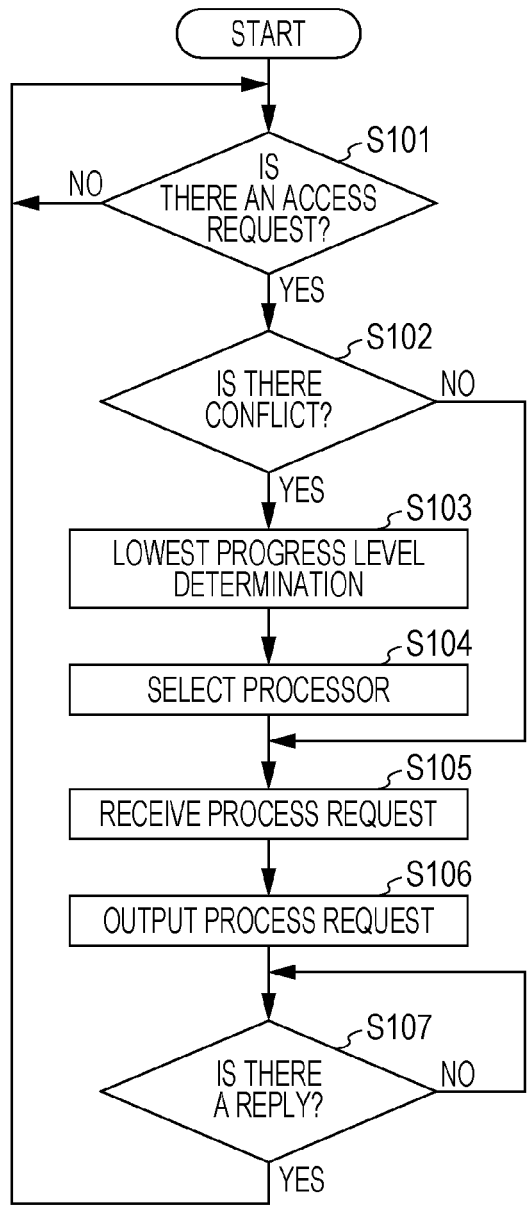
FIG. 6 is a diagram illustrating an example of an operational flowchart for processing executed by an arbiter, according to an embodiment.

Next, an explanation of a flow of processing executed by the arbiter 14 will be provided with reference to FIG. 6. FIG. 6 is a diagram illustrating an example of an operational flowchart for processing executed by an arbiter, according to an embodiment. The arbiter 14 executes the processing illustrated in FIG. 6 in parallel for each external device.

For example, the arbiter 14 determines whether an access request is present (step S101). When it is determined that an access request is present (step S101: Yes), the arbiter 14 determines whether a conflict has occurred (step S102). When it is determined that a conflict has occurred due to access requests to the same external device being present (step S102: Yes), the arbiter 14 executes a lowest progress level determination (step S103). That is, the arbiter 14 receives progress levels from the processors that are the transmission sources of the conflicting access requests and determines which value among the received progress levels has the lowest progress level.

Next, the arbiter 14 selects the processor having the value with the lowest measured progress level (step S104), receives the process request from the selected processor (step S105), and outputs the received process request (step S106). Moreover, the arbiter 14 determines whether a reply to the process request is present (step S107), and when a reply is present (step S107: Yes), executes step S101.

Meanwhile, when it is determined that no reply is present (step S107: No), the arbiter 14 executes step S107 until a reply is received. When it is determined that no conflict is present (step S102: No), the arbiter 14 skips steps S103 and S104 and executes step S105. When no access request is present (step S101: No), the arbiter 14 executes the processing from step S101 again.

(Effects of Information Processing Device 10)

As described above, the information processing device 10 includes the processor 11 that include the arithmetic circuit 11b executing arithmetic processes and the measuring circuit 11a measuring progress levels that indicate the progresses of the arithmetic processes executed by the arithmetic circuit 11b. The information processing device 10 also includes the processors 12 and 13 which are similar to the processor 11. Upon receiving access requests for external devices from the plurality of processors 11 to 13, the information processing device 10 arbitrates the access requests, based on a comparison result of progress levels measured by measuring circuits of the processors that are the transmission sources of the access requests. As a result, since the progress levels of the division processes executed by the processors 11 to 13 are balanced, the time period for which the processor that completes the processing the earliest is made to wait in a wasteful manner is shortened, thereby allowing the information processing device 10 to improve processing performance when processing tasks in parallel.

The arithmetic circuit 11b executes division processes by dividing the division processes into a plurality of unit processes. The measuring circuit 11a adds one to the value of the measured progress level each time the arithmetic circuit 11b executes a unit process. As a result, the information processing device 10 is able to execute the arbitration of the access requests in accordance with the degrees of progresses of the division processes executed by the processors 11 to 13.

In a case where there exist a plurality of external devices that are the subjects to which access requests are issued, the information processing device 10 executes, for each of the plurality of external devices, the arbitration of the access requests, based on a comparison result of progress levels measured by the measuring circuits of the processors that are transmission sources of the access requests. As a result, when the access requests are issued to a plurality of external devices by the processors 11 to 13, the information processing device 10 is able to execute the access requests in accordance with the progress levels for each of the plurality of external devices. As a result, since access requests to external devices that do not have conflicts may be issued promptly when a plurality of external devices are present, the information processing device 10 is able to improve processing performance when dividing tasks.

Embodiment 2

The abovementioned information processing device 10 performs arbitration of access requests issued by the processors 11 to 13 included in the information processing device 10. However, the embodiment is not limited thereto. For example, when the information processing device 10 has architecture, such as a shared memory system of a non-uniform memory access (NUMA) type that allows accesses to the various external devices managed by the information processing device 10a, or a memory distribution system of a massively multi-processor (MPP) type or a PC cluster type, the information processing device 10 may transmit, to the information processing device 10a, a process request to which the progress level is added. That is, when the information processing device 10 is not an information processing device within which the memory access is concluded, such as a symmetric multiprocessing (SMP) or a UMA type of memory shared system, the information processing device 10 may add the progress level to a request for various types of processing when transmitting the request to another information processing device such as the information processing device 10a.

The following is an explanation, as a second embodiment, of an information processing device 10b that adds, to an access request, the progress level of the processor that is the transmission source of the access request, and transmits the access request to which the progress level is added to another information processing device.

Figure 7:
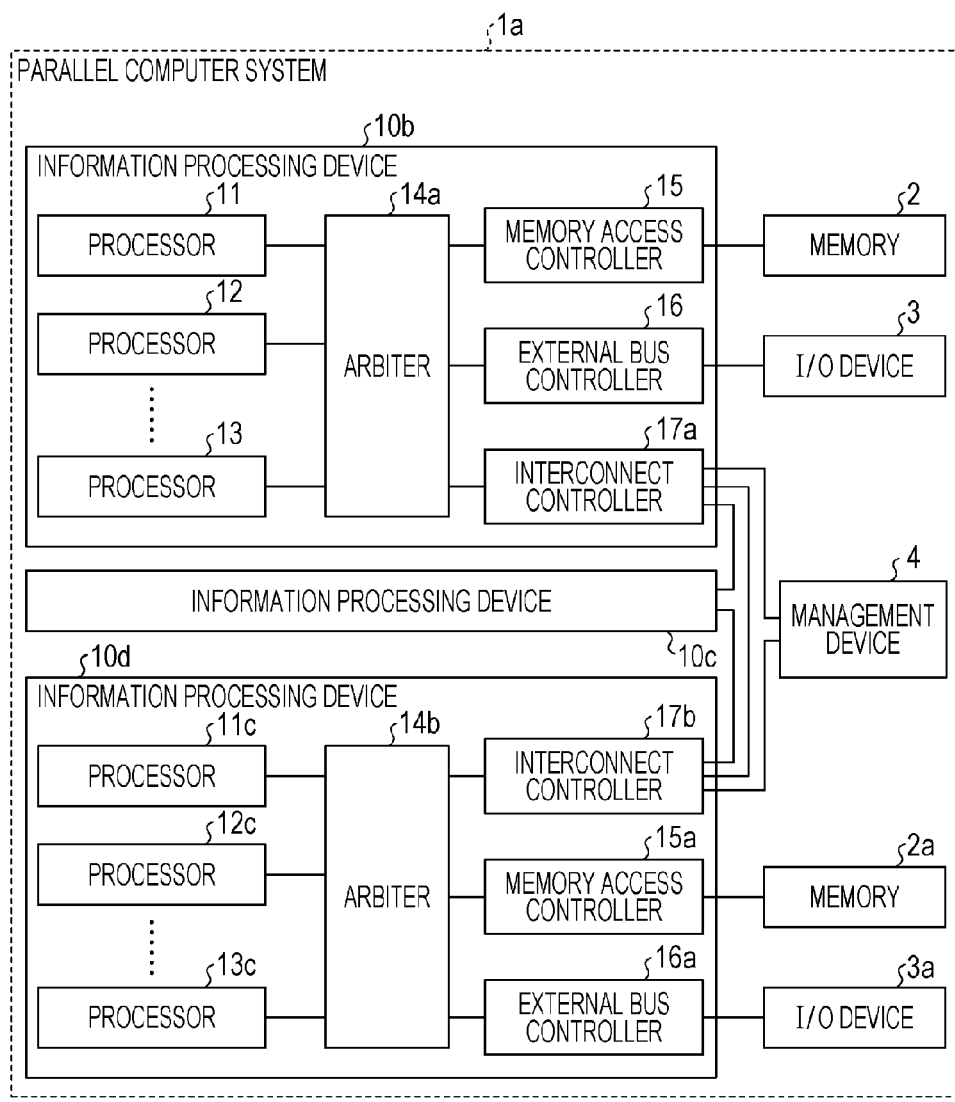
FIG. 7 is a diagram illustrating an example of a hardware configuration of an information processing device, according to an embodiment.

FIG. 7 is a diagram illustrating an example of a hardware configuration of an information processing device, according to an embodiment. In the following explanation, hardware configurations that exhibit the same functions as the hardware configurations in FIG. 1 are provided with the same reference numbers and explanations thereof will be omitted. For example, a parallel computer system is has a plurality of information processing devices 10b to 10d.

Moreover, the information processing device 10b includes an arbiter 14a and an interconnect controller 17a. The information processing device 10d includes a plurality of processors 11c to 13c, an arbiter 14b, a memory access controller 15a, an external bus controller 16a, and an interconnect controller 17b. The information processing device 10d is connected to a memory 2a and an I/O device 3a. The hardware configurations 11c to 13c, 14b, 15a, 16a, and 17b in the information processing device 10d exhibit the same functions as the respective hardware configurations 11 to 13, 14a, 15, 16, and 17a in the information processing device 10b and explanations thereof will be omitted. Moreover, the information processing device 10c exhibits the same functions as the information processing device 10b and explanations thereof are omitted.

The arbiter 14a executes the arbitration process in the same way as the arbiter 14. Specifically, the arbiter 14a receives access requests and progress levels from the processors 11 to 13. The arbiter 14a receives access requests and progress levels that are measured by the processors in the other information processing devices 10b and 10c, from the interconnect controller 17a. When a plurality of access requests to the same external device are received, the arbiter 14a performs arbitration of the access requests based on the progress levels received from the processors that are the transmission sources of the access requests and from the interconnect controller 17a.

For example, the arbiter 14a receives, from the processor 11, an access request to the memory 2 and a progress level measured by the processor 11. The arbiter 14a further receives an access request and a progress level measured by the processor 11c from the interconnect controller 17a. In this case, the arbiter 14a compares the progress level of the processor 11 and the progress level of the processor 11c.

The arbiter 14a then outputs a notification indicating that an access right has been given to the interconnect controller 17a when, as a result of the comparison, the progress level of the processor 11c is less than a value of the progress level of the processor 11. In this case, the interconnect controller 17a outputs the process request issued by the processor 11c to the memory access controller 15 via the arbiter 14a.

In this case, the memory access controller 15 generates a reply including the result of the memory access and outputs the generated reply destined for the processor 11c to the interconnect controller 17a. Next, the interconnect controller 17a transmits the received reply to the interconnect controller 17b of the information processing device 10d which transmits the reply to the processor 11c.

Moreover, the arbiter 14a executes the following processing when process requests to an external device, such as the memory 2a or the I/O device 3a, managed by the information processing device 10d, are outputted from the processors 11 to 13 to the interconnect controller 17a. That is, the arbiter 14a outputs, to the interconnect controller 17a, the process request together with the progress level measured by the processor that is the transmission source of the process request.

Upon receiving the process request and the progress level from the arbiter 14a, the interconnect controller 17a generates a packet in which the progress level is added to the received process request, and transmits the generated packet to the information processing device 10c or to the information processing device 10d. FIG. 8 is a diagram illustrating an example of a packet format outputted by an information processing device, according to an embodiment.

For example, the interconnect controller 17a generates a packet which stores, in order from the beginning, an identifier (ID) for identifying the packet, a packet type, and a destination address indicating the transmission destination of the process request, as illustrated in FIG. 8. In this case, the interconnect controller 17a generates the packet so that the packet further includes a request origin address indicating the processor that is the transmission source of the process request, a progress level measured by the processor that is the transmission source of the process request, and the data of the process request. The interconnect controller 17a then transmits the generated packet to the information processing devices 10c and 10d according to the destination address stored in the packet.

Upon receiving a packet from the other information processing device 10c or 10d, the interconnect controller 17a generates a process request from the various types of data stored in the packet, and extracts the progress level from the packet. The interconnect controller 17a outputs the access request and the extracted progress level to the arbiter 14a. Upon receiving the notification indicating that an access right has been given, the interconnect controller 17a outputs the generated process request to the arbiter 14a.

As described above, even when access requests are received from processors in other information processing devices 10c and 10d, the information processing device 10b is able to arbitrate the access requests in accordance with process progress levels of the processors that are the transmission sources of the access requests. As a result, even when division processes obtained by dividing one job are executed by the processors 11 to 13 and 11c to 13c, the parallel computer system 1a is able to balance the time periods for which the processors 11 to 13 and 11c to 13c complete the division processes. As a result, the parallel computer system 1a is able to further improve processing performance of the parallel processing.

In the example described above, the interconnect controller 17a that has received a packet in which the process request and the progress level are stored, outputs the progress level and the access request stored in the packet to the arbiter 14a. However, the embodiment is not limited thereto. For example, the processors 11 to 13 and 11c to 13c, and the interconnect controllers 17a and 17b output process requests in the form of a packet illustrated in FIG. 8, to the arbiters 14a and 14b. In this case, the arbiters 14a and 14b may directly arbitrate the process requests by outputting the process request from a packet that is selected, in ascending order of a progress level stored in the packet, from among the received packets.

(Effects of Information Processing Device 10b)

As described above, the information processing device 10b arbitrates the access requests to external devices managed by the other information processing devices 10c and 10d. When transmitting an access request to the other information processing device 10c or 10d, the information processing device 10b transmits the progress level measured by the processor that is the transmission source of the access request along with the process request. As a result, the information processing device 10b is able to cause the other information processing device 10c or 10d to execute the arbitration in accordance with the progress levels of the processors 11 to 13 in the information processing device 10b. As a result, since the parallel computer system is able to balance the time periods that the processors 11 to 13 and 11c to 13c complete the division processes even when the division processes obtained by dividing one job are executed by the information processing devices 10b to 10d, the processing performance for parallel processing may be further improved.

Embodiment 3

The embodiments explained up to this point may be implemented in various different forms other than the above-mentioned embodiments. A third embodiment describes another embodiment included in the present disclosure.

(1) Measuring Progress Level

The abovementioned information processing device 10 includes the processors 11 to 13 that have the measuring circuits 11a to 13a for measuring progress levels. However, the embodiment is not limited thereto. For example, the information processing device 10 may include a measuring circuit for measuring the progress level of processing executed by the processors 11 to 13, disposed outside of the processors 11 to 13.

Figure 9:
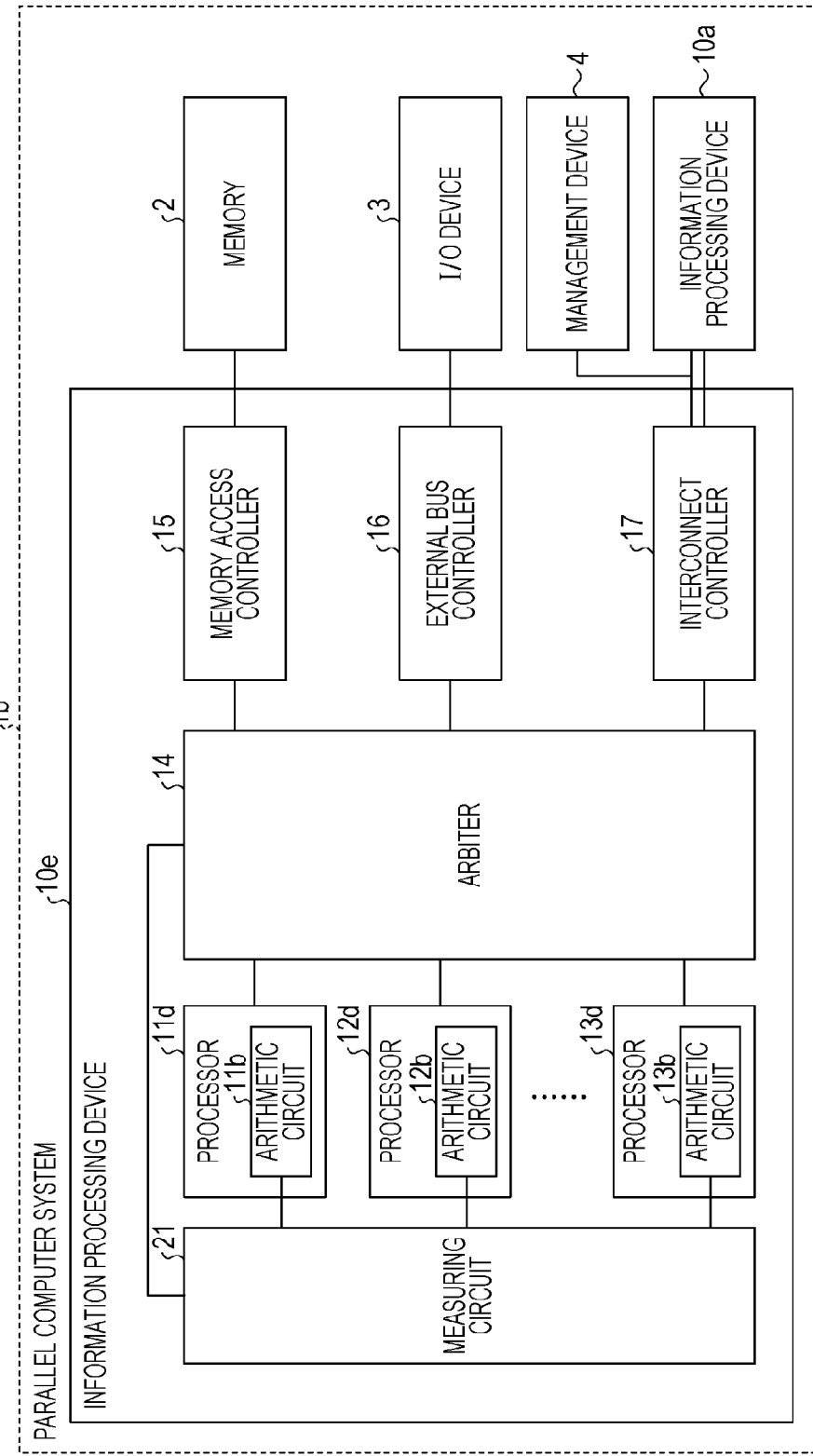
FIG. 9 is as diagram illustrating an example of a hardware configuration of an information processing device, according to an embodiment.

FIG. 9 is as diagram illustrating an example of a hardware configuration of an information processing device, according to an embodiment. Hardware configurations that exhibit the same functions as the hardware configurations in FIG. 1 among the hardware configurations in FIG. 9 are provided with the same reference number and explanations thereof will be omitted. For example, a parallel computer system 1b includes an information processing device 10e in place of the information processing device 10. The information processing device 10e includes processors 11d to 13d in place of the processors 11 to 13, and moreover includes a measuring circuit 21 connected to the processors 11d to 13d and the arbiter 14.

The processors 11d to 13d include only the arithmetic circuits 11b to 13b, respectively. The measuring circuit 21 measures the progress levels of the division processes executed by the arithmetic circuits 11b to 13b in the processors 11d to 13d in the same way as the measuring circuits 11a to 13a. For example, the measuring circuit 21 measures the local times of the arithmetic circuits 11b to 13b as the progress levels. The measuring circuit 21 then outputs the measured progress levels to the arbiter 14.

The measuring circuit 21 may calculate, as the progress levels of the processors 11d to 13d, differences between the local times of the arithmetic circuits 11b to 13b and the global times based on a clock signal of the information processing device 10e. Moreover, the measuring circuit 21 may calculate, as the progress levels of the processors 11d to 13d, the differences between average values of the local times of the arithmetic circuits 11b to 13b and the local times of the arithmetic circuits 11b to 13b.

The measuring circuit 21 may be built into the arbiter 14. That is, the measuring circuits 11a to 13a and 21 may be disposed in any position as long as the measuring circuits 11a to 13a and 21 are able to measure the progress of the division processes executed by the processors 11d to 13d.

In this way, the information processing device 10e includes the plurality of processors 11d to 13d, and the measuring circuit 21 that measures the progress levels indicating the progresses of the processing executed by the processors 11d to 13d. The information processing device 10e arbitrates the access requests from the processors 11d to 13d based on the progress levels measured by the measuring circuit 21. As a result, the information processing device 10e is able to improve performance of the parallel computing processing as a result of balancing the progresses of the division processes executed by the processors 11d to 13d.

The information processing device 10e includes the measuring circuit 21 separated from the processors 11d to 13d. As a result, the information processing device 10e is able to measure the progress levels of the division processes executed by the processors 11d to 13d with an operation clock in the information processing device 10e. As a result, the information processing device 10e is able to suitably measure the progress levels of the division processes executed by the processors 11d to 13d even if the frequencies of operation clocks in the processors 11d to 13d are different.

(2) Progress Level

The abovementioned measuring circuit 11a measures, as the progress level, a value incremented each time the arithmetic circuit 11b completes a unit process. However, the embodiment is not limited thereto. That is, the measuring circuit 11a is able to use any value as a progress level as long as the ratio of the amount of processing already finished to the amount of processing to be performed by each of the processors 11 to 13 is able to be compared in a relative manner among the processors 11 to 13.

For example, the measuring circuit 11a may measure, as the progress level, the ratio of the number of calculations actually executed by the arithmetic circuit 11b to the total number of calculations to be executed in order to complete the division process executed by the arithmetic circuit 11b. For example, when a certain task is executed in parallel by a plurality of processors, software such as a compiler divides the task. In this case, the software notifies the measuring circuit 11a about the total number of calculations to be executed in order to complete the division process, such as the divided thread or process, allocated to each of the plurality of processors. The measuring circuit 11a may measure, as the progress level, the ratio of the number of calculations actually executed by the arithmetic circuit 11b to the total number of calculations included in the notification.

The measuring circuit 11a may stop the count of the progress level during clock cycles in which the calculation processing is executed by the arithmetic circuit 11b, and execute the count of the progress level during clock cycles in which the calculation processing is not executed, for example, when the arithmetic circuit 11b performs an external access and the like. The measuring circuit 11a may start the count of the progress levels when an access request is issued to the arbiter 14, and the count of the progress level may be performed when the arbiter 14 receives the access request, when the processing to the external device is started, or during the time until the reply is received.

When this processing is performed, the size of the circuitry of the measuring circuit 11a may be reduced since the number of digits for representing the progress level is reduced when the arithmetic circuit 11b executes the division process in which the external access amount is smaller than the calculation amount. When this processing is executed, the arbiter 14 issues the process request from the processor for which the progress level value is the largest among the processors that are the transmission sources of the access requests since the value of the progress level increases in proportion to the amount of delay in processing by the processors.

(3) Arbiter

The abovementioned arbiter 14 performs the round-robin or the LRU arbitration when the progress levels of a plurality of processors that are the transmission sources of access requests are the same. However, the embodiment is not limited thereto. For example, the arbiter 14 may prioritize the access requests to the other information processing device 10a in consideration of a delay in communication time. Moreover, the arbiter 14 may prioritize the access requests from the interconnect controller 17 when the interconnect controller 17 receives packets that have accumulated over a long period of time due to congestion over the communication network.

(4) Interconnect Controller

The abovementioned interconnect controller 17a stores, in a packet, a progress level of a processor that is the transmission source of a process request. However, the embodiment is not limited thereto. For example, when packets are cached for a certain period of time due to congestion over the communication network, the interconnect controller 17a may execute prioritized processing by subtracting a certain value from a progress level stored in the cached packet. That is, the interconnect controller 17a may give increased priority to a process request stored in a packet in accordance with the amount of time for which transmission of the packet has been suspended.

(5) Other

The parallel computer system 1 may include any of the abovementioned information processing devices 10 and 10a to 10e in combination. The parallel computer system 1 may combine the functions of the information processing devices 10 and 10a to 10e as appropriate as long as consistency is maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for controlling an information processing device including an arbiter and a plurality of arithmetic processors, each arithmetic processor including an arithmetic circuit and a measuring circuit, the measuring circuit including a multiplexer circuit a counter circuit, and an incrementer circuit, the method comprising:

measuring, by the measuring circuit, for each of the plurality of arithmetic processors, a progress level indicating progress of arithmetic processing executed by each arithmetic processor by performing a process including:

causing the counter circuit to hold a first value and output the first value held therein, causing the incrementer circuit to output a second value obtained by incrementing the first value output by the counter circuit, causing the multiplexer circuit to select one of the first value and the second value output by the counter circuit and the incrementer circuit, respectively, and to output to the counter circuit the one of the first value and the second value selected by the multiplexer circuit, causing the multiplexer circuit to, upon receiving from the arithmetic circuit a selection signal indicating that a unit process is completed, select the second value output by the incrementer circuit and output to the counter circuit the second value selected by the multiplexer circuit to increment the first value stored in the counter circuit, and measuring the first value as the progress level; and upon receiving access requests to an external device from first arithmetic processors included in the plurality of arithmetic processors, arbitrating, by the arbiter, the access requests based on progress levels measured for the first arithmetic processors that are transmission sources of the access requests.

2. The method of claim 1, further comprising:

causing the arithmetic circuit to
separate the arithmetic process into a plurality of unit processes, each unit process executed in a unit time by the arithmetic processor,
execute the unit processes, and
output to the multiplexer circuit of the measuring circuit, upon completion of execution of each unit process, a third signal indicating the unit process is finished; and causing the multiplexer circuit of the measuring circuit to select the second value output by the incrementer circuit and to output to the counter circuit the second value selected by the multiplexer circuit to increment the first value stored in the counter circuit, each time the multiplexer circuit of the measuring circuit receives the selection signal from the arithmetic circuit.

3. The method of claim 1, further comprising causing the measuring circuit to:

start counting a local time, based on a clock operated by the arithmetic processor, at a first time when the arithmetic processor starts execution of the arithmetic process, output a value of counted time obtained by the counting, as the progress level for the arithmetic process, to the arbiter at a second time when an access request to the external device is issued by the arithmetic processor, and interrupt the counting of the local time from the second time to a third time when a reply to the access request is received by the arithmetic processor.

4. An apparatus comprising:

an information processing device, including
an arbiter; and
a plurality of arithmetic processors, each including:
an arithmetic circuit configured to execute an arithmetic process, and
a measuring circuit configured to measure a progress level indicating progress of the arithmetic process executed by the arithmetic circuit, the measuring circuit including a multiplexer circuit, a counter circuit that holds a first value output by the multiplexer circuit and outputs the first value held therein, and an incrementer circuit that outputs a second value obtained by incrementing the first value output by the counter circuit, wherein the multiplexer circuit of the measuring circuit is configured to select one of the first value and the second value output by the counter circuit and the incrementer circuit, respectively, and to output to the counter circuit the one of the first value and the second value selected by the multiplexer circuit;

upon receiving from the arithmetic circuit a selection signal indicating that a unit process is completed, the multiplexer circuit selects the second value output by the incrementer circuit and outputs to the counter circuit the second value selected by the multiplexer circuit to increment the first value stored in the counter circuit;

the measuring circuit measures the first value as the progress level; and the arbiter is configured to, upon receiving first access requests to an external device from first arithmetic processors included in the plurality of arithmetic processors, arbitrate the first access requests, based on a comparison result of comparing first progress levels measured by the measuring circuits of the first arithmetic processors that are transmission sources of the first access requests.

5. The apparatus of claim 1, wherein
the arithmetic circuit outputs as the selection signal a pulse signal, having a high electric potential, to the multiplexer circuit of the measuring circuit.

6. The apparatus of claim 1, wherein, when a plurality of external devices to which access requests are to be issued are present, upon receiving second access requests to each of the plurality of external devices from second arithmetic processors included in the plurality of arithmetic processors, the arbiter arbitrates the second access requests, based on progress levels measured by the measuring circuits of the second arithmetic processors that are transmission sources of the second access requests to the plurality of external devices.

7. The apparatus of claim 1,
further comprising another information processing device, and
wherein the information processing device further includes a transmitter configured to, upon receiving a third access request to an external device controlled by the other information processing device, transmit the progress level measured by the measuring circuit of the arithmetic processor that is a transmission source of the third access request, and an execution request for requesting the external device to execute processing, to the other information processing device.

8. The apparatus of claim 1,
wherein the arithmetic circuit is configured to
separate the arithmetic process into a plurality of unit processes, each unit process executed in a unit time by the arithmetic processor,
execute the unit processes, and
output to the multiplexer circuit of the measuring circuit, upon completion of execution of each unit process, a selection signal indicating the unit process is finished; and
wherein the multiplexer circuit selects the second value output by the incrementer circuit and outputs to the counter circuit the second value selected by the multiplexer circuit to increment the first value stored in the counter circuit, each time the multiplexer circuit receives the selection signal from the arithmetic circuit.

9. The apparatus of claim 1, wherein the measuring circuit is configured to start counting a local time, based on a clock operated by the arithmetic processor, at a first time when the arithmetic processor starts execution of the arithmetic process, output a value representing counted time obtained by the counting, as the progress level for the arithmetic process, to the arbiter at a second time when an access request to the external device is issued by the arithmetic processor, and interrupt the counting of the local time from the second time to a third time when a reply to the access request is received by the arithmetic processor.

10. An apparatus comprising:

a plurality of arithmetic processors;

a measuring circuit configured to measure, for each of the plurality of arithmetic processors, a progress level indicating progress of arithmetic processing executed by each arithmetic processor, the measuring circuit including a multiplexer circuit, a counter circuit that holds a first value output by the multiplexer circuit and outputs the first value held therein, and an incrementer circuit that outputs a second value obtained by incrementing the first value output by the counter circuit; and an arbiter configured to, upon receiving access requests to an external device from first arithmetic processors included in the plurality of arithmetic processors, arbitrate the access requests based on progress levels measured by the measuring circuits of the first arithmetic processors that are transmission sources of the access requests, wherein the multiplexer circuit of the measuring circuit is configured to select one of the first value and the second value output by the counter circuit and the incrementer circuit, respectively, and to output to the counter circuit the one of the first value and the second value selected by the multiplexer circuit;

upon receiving from the arithmetic circuit a selection signal indicating that a unit process is completed, the multiplexer circuit selects the second value output by the incrementer circuit and outputs to the counter circuit the second value selected by the multiplexer circuit to increment the first value stored in the counter circuit; and the measuring circuit measures the first value as the progress level.

11. The apparatus of claim 10, wherein the measuring circuit is configured to start counting a local time, based on a clock operated by the arithmetic processor, at a first time when the arithmetic processor starts execution of the arithmetic process, output a value of counted time obtained by the counting, as the progress level for the arithmetic process, to the arbiter at a second time when an access request to the external device is issued by the arithmetic processor, and interrupt the counting of the local time from the second time to a third time when a reply to the access request is received by the arithmetic processor.

* * * * *